United States Patent [19]
McDaniel

[11] Patent Number: 5,375,864
[45] Date of Patent: Dec. 27, 1994

[54] FOLD-DOWN STEP FOR VEHICLES

[75] Inventor: Gale E. McDaniel, Kennewick, Wash.

[73] Assignee: McDaniel Manufacturing, Inc., Richland, Wash.

[21] Appl. No.: 80,952

[22] Filed: Jun. 21, 1993

[51] Int. Cl.$^5$ ............................................. B60R 3/02
[52] U.S. Cl. ........................................ 280/166; 182/89
[58] Field of Search ................... 280/166, 164.1, 163, 280/301, 298; 182/89, 91; 105/447

[56] References Cited

U.S. PATENT DOCUMENTS

| 3,751,068 | 8/1973 | Green ........................... 280/166 |
| 3,758,134 | 9/1973 | Stewart ......................... 280/163 |
| 3,980,319 | 9/1976 | Kirkpatrick .................... 280/166 |

FOREIGN PATENT DOCUMENTS

| 0255144 | 10/1988 | Japan ......................... 280/166 |
| 0403594 | 3/1974 | U.S.S.R. .................... 280/166 |
| 9204208 | 3/1992 | WIPO .......................... 280/166 |

Primary Examiner—Eric D. Culbreth
Assistant Examiner—Peter C. English
Attorney, Agent, or Firm—Wells, St. John, Roberts, Gregory & Matkin

[57] ABSTRACT

A fold-down step arrangement is mountable to a vehicle to provide an intermediate step for the vehicle chassis. The invention includes a step plate that is pivotably mounted by parallelogram swing arms to a bracket secured to the vehicle chassis. The pivot axes of the arms are inclined to enable the step plate to be moved between a down and outward operative position and an up and inward inoperative position. A spring normally urges the step plate and arms attached thereto to the storage position. A connector linkage cable is also provided between the step plate and vehicle door such that the sliding enclosed cable will move in response to opening and closing of the vehicle door. The arrangement is such that opening of the door will cause corresponding motion of the step plate from the elevated storage position to the lowered operative position. Thus, when the door is open, the step plate is in an operative position for use. When the door is closed, the step plate is positioned in an inoperative position substantially at the ground clearance height of the vehicle chassis. A safety release is provided to allow separation of the cable from its connection to the plate should the step plate become bound in its storage position.

21 Claims, 5 Drawing Sheets

FOLD-DOWN STEP FOR VEHICLES

TECHNICAL FIELD

The present invention relates to folding steps mountable to vehicle chassis.

BACKGROUND OF THE INVENTION

Many conventional and modified vehicles include elevated chassis. An example of such a vehicle arc "off-road" four wheel drive vehicles in which the chassis is elevated substantially for ground clearance purposes. Such vehicles, and others having high chassis, are difficult to climb into.

As a solution to the access problem, steps have been mounted to the vehicle chassis to provide lower step access to the vehicle passenger compartment. Provision of such apparatus effectively lowers the elevation of the vehicle chassis and therefore defeats the purpose in maximizing ground clearance.

It is known to provide folding steps, particularly for recreational vehicles. Such steps are typically rigid and are mounted to the recreational vehicle adjacent to a door. The steps will fold on a horizontal axis from an elevated storage position adjacent the door, to a lowered operative position. It is frequent that the steps fold upward into the swing path of the door in the inoperative, storage position. While this arrangement functions well to selectively alter the access elevation, the step apparatus is bulky and unsightly. This is especially true if such step configurations are to be used for primary occupant access doors in vehicles such as four-wheel drive trucks, etc.

A need has therefore remained to provide a folding form of access step that will not effectively lower the working elevation of a vehicle chassis, while functioning to provide easy access to the elevated chassis. It is also desirable to obtain some form of folding access step arrangement that does not require special manipulations by the user to move between lowered, operative positions, and elevated, storage positions.

The present fold-down step accomplishes the above objectives by providing a step arrangement that is readily foldable from an elevated, storage condition in which the step maintains a relatively low profile under the vehicle chassis and thereby does not interfere or effectively lower the ground clearance for the vehicle. The present fold-down step is also operative to move into a outwardly projecting, downward operative position providing easy foot access to support a user on entrance or egress to or from the adjacent vehicle. The present fold-down step also includes features that enable automatic operation of the fold-down step to move between the operative and inoperative positions responsive to opening and closing of the vehicle door.

BRIEF DESCRIPTION OF THE DRAWINGS

Preferred embodiments of the invention are described below with reference to the accompanying drawings, which are briefly described below.

FIG. 6 is an enlarged detail view of a cable safety release mechanism.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A preferred form of the present fold-down step is illustrated in the drawings and is designated by the reference numeral 10. The preferred form of fold-down step 10 as shown is provided to be mounted to a vehicle 11 having a vehicle chassis 12 and a hinged door 13 (FIGS. 2, 3) mounted to the vehicle for movement between open and closed conditions. A variety of vehicles may be used in conjunction with the present step 10. Most advantageous usage will be found with vehicles having elevated chassis where an intermediate elevation is desired to facilitate entrance or egress from the vehicle chassis.

The present step 10 is mountable to the chassis 12 at a select elevation, preferably on a horizontal undersurface 15 (FIG. 1) of the chassis and inboard of an access door 13 and chassis sidewall 16.

Figures 1, 2:
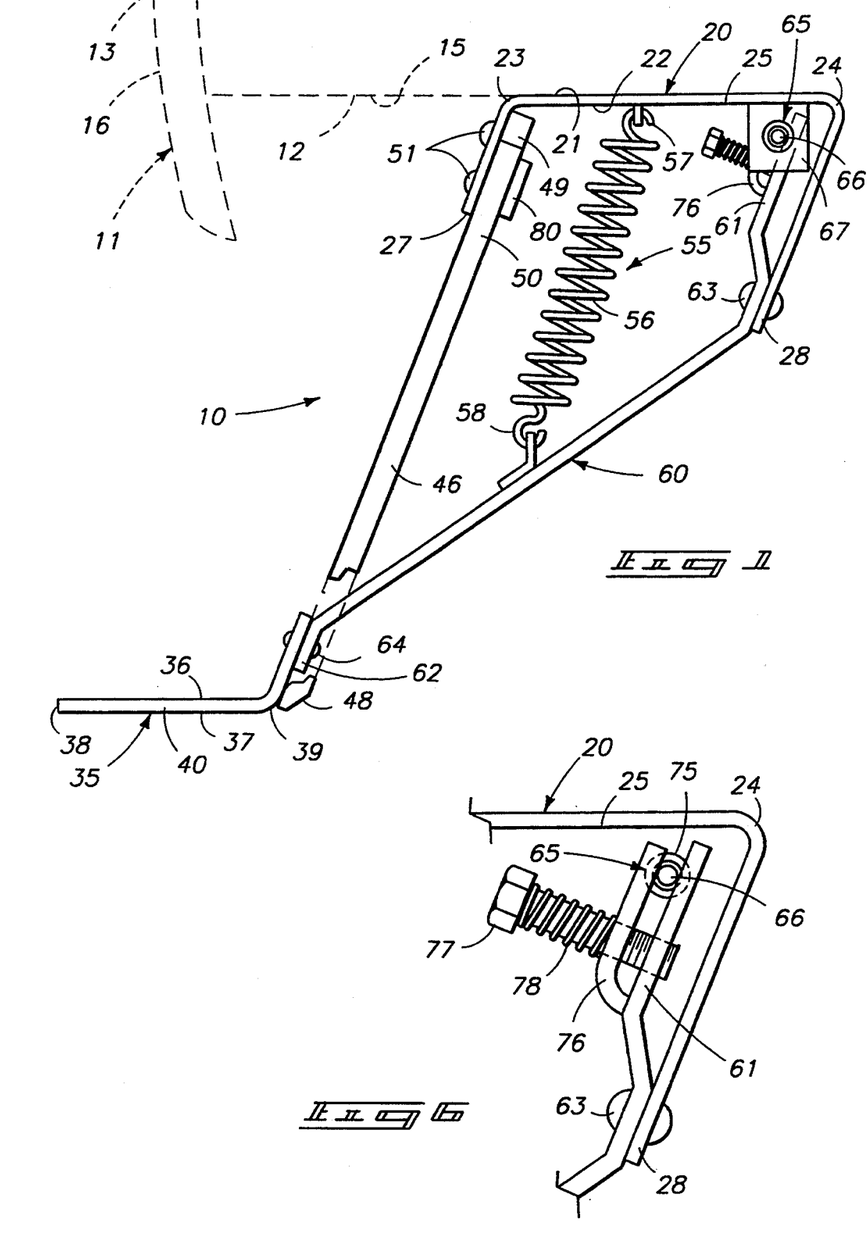
FIG. 1 is a side elevation view of the preferred present fold-down step, an associated vehicle chassis being shown in broken lines.
FIG. 2 is a diagrammatic view thereof, showing the inoperative storage condition of the fold-down step with an associated vehicle door in a closed position.
Figure 2:
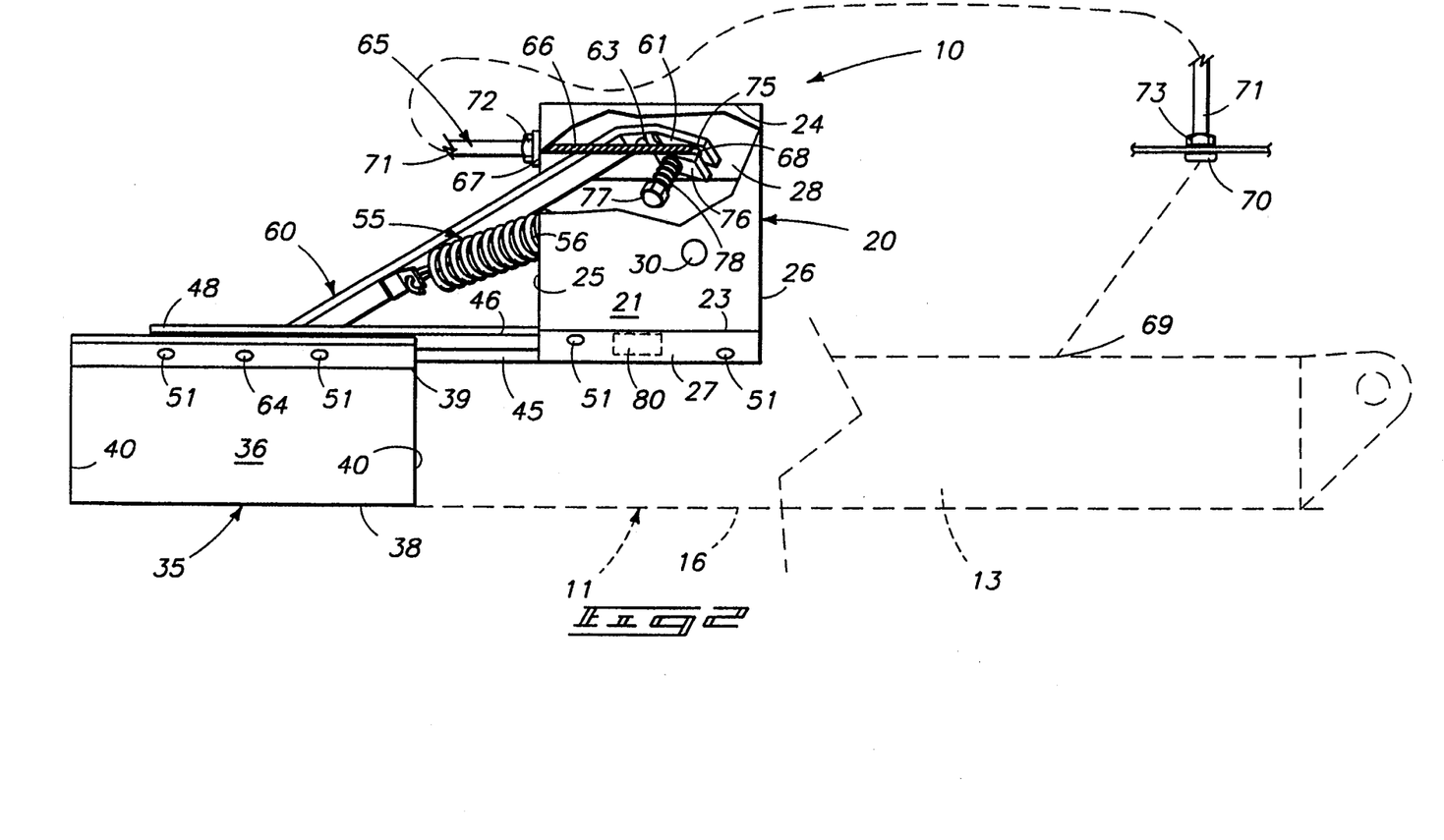
Figure 3:
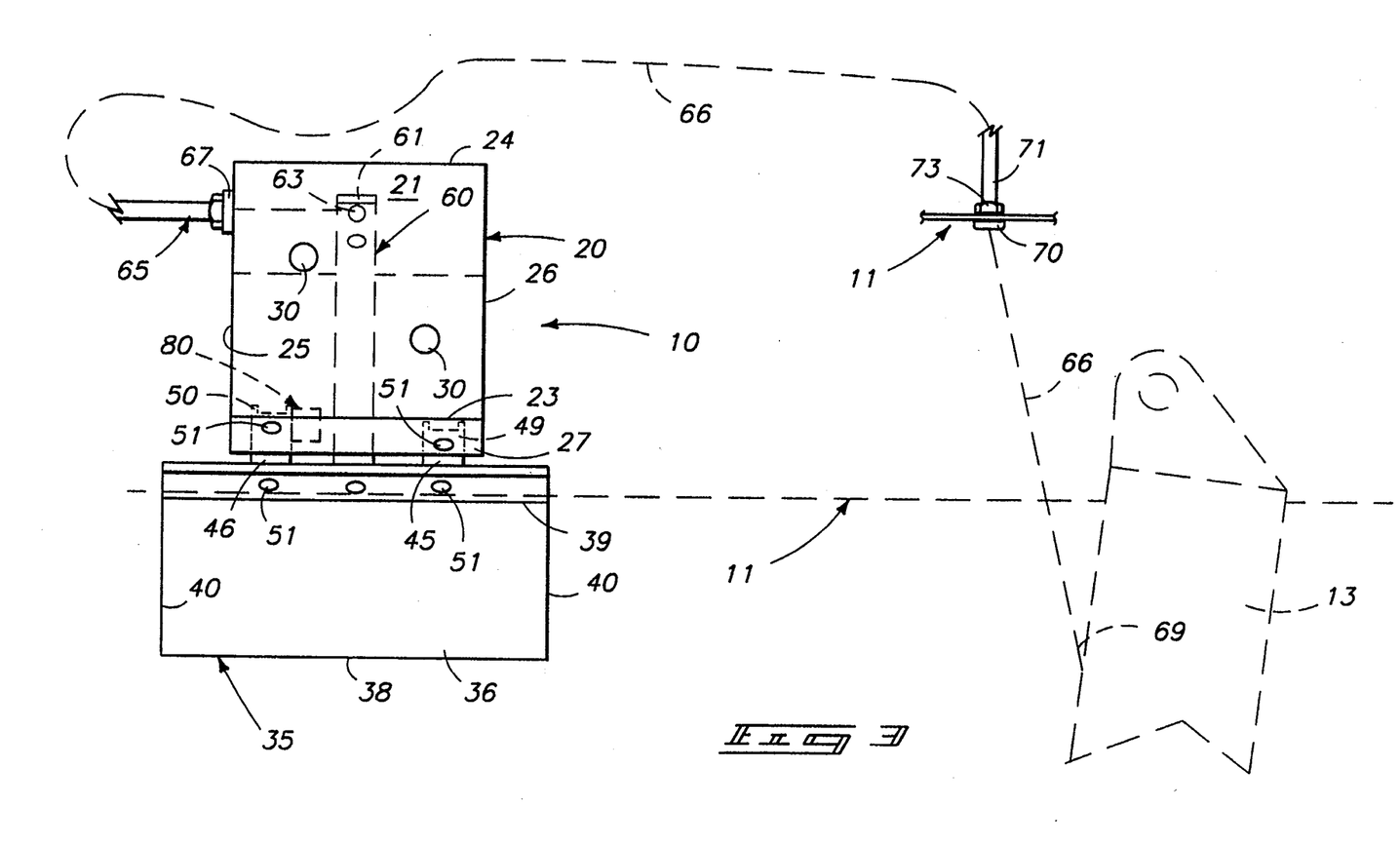
FIG. 3 is a diagrammatic view, enlarged from FIG. 2 only showing the operative position of the fold-down step with the associated vehicle door in an open position.
Figure 4:
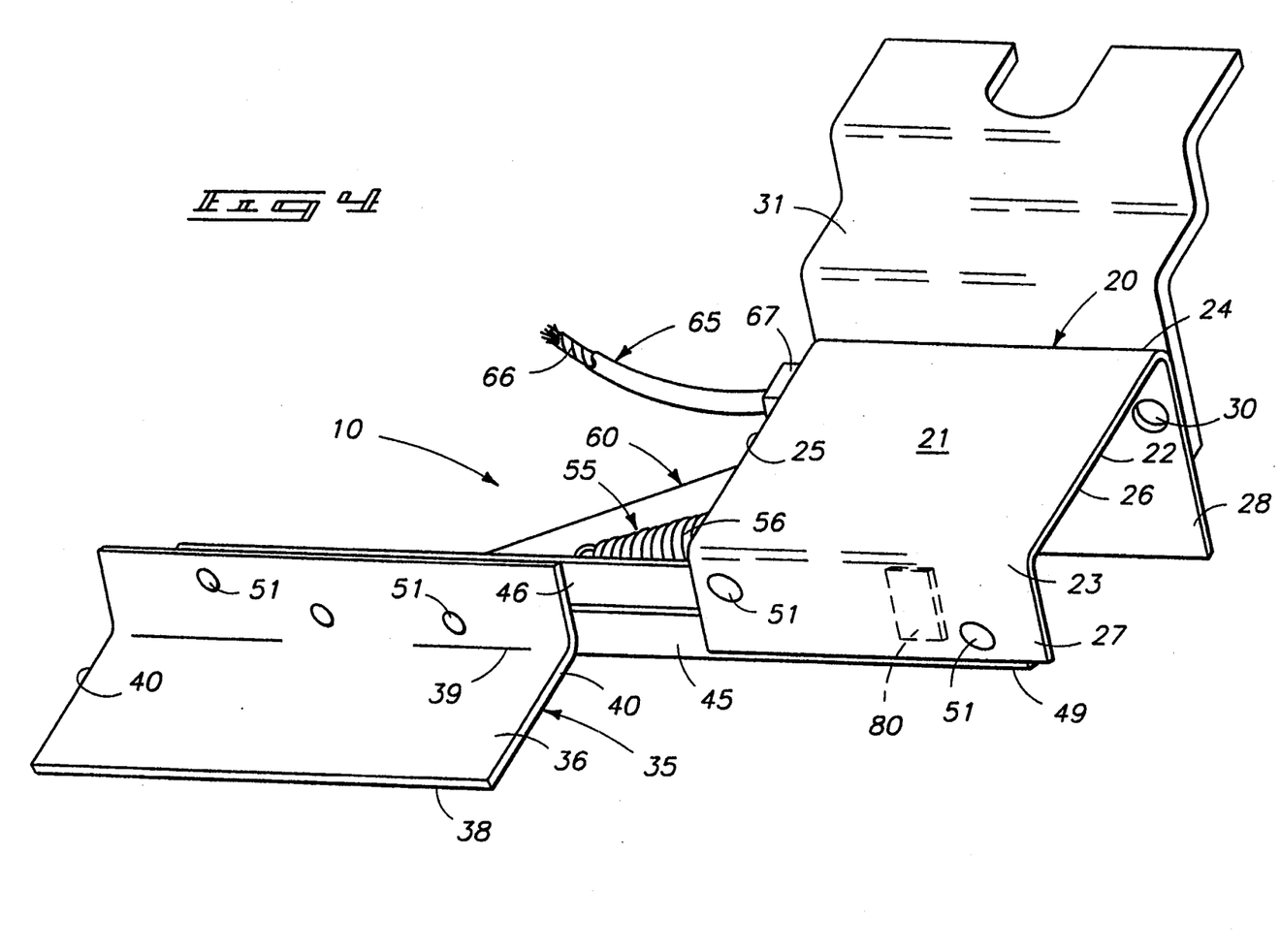
FIG. 4 is a perspective view of the present preferred fold-down step in the inoperative storage position.
Figure 5:
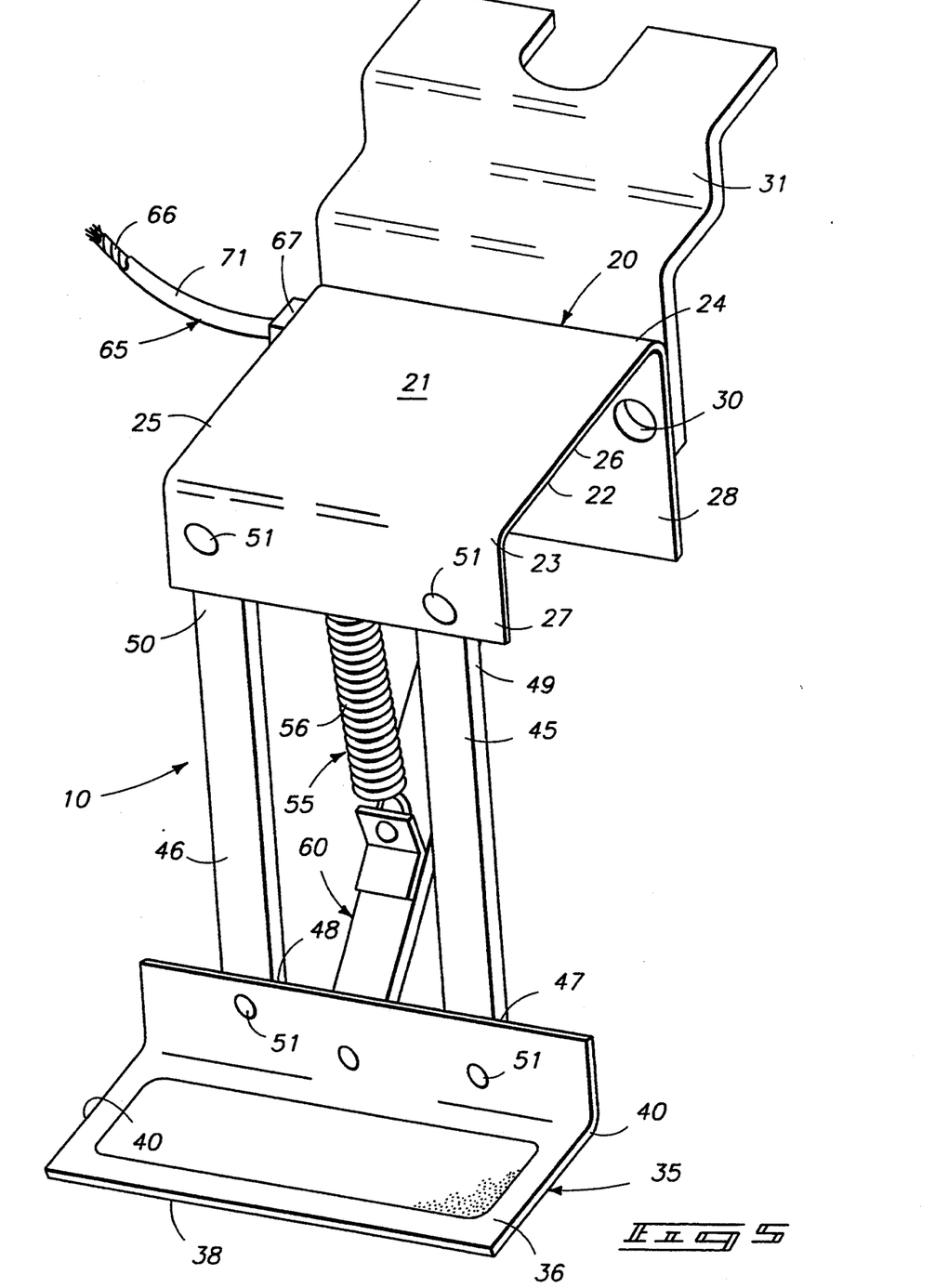
FIG. 5 is a perspective view similar to FIG. 4, only showing the step in an operative position.

The present preferred fold-down step folds, in response to closing and opening of the door 13, between a folded, compact storage position (FIGS. 2 and 4) and a down and outward projecting operative position (FIGS. 1, 3 and 5).

For purposes of further description and understanding of spatial relations herein, the term "inward" will relate to locations toward the midsection of the associated vehicle. "Outward" relates to locations away from the midsection of the associated vehicle. "Forward" relates to the front end of the associated vehicle, and "rearward" relates to the intended rearward end of the vehicle. Description of the present step will be given in the above terms, as if the step is mounted to the vehicle 11 at a location under the chassis 12 and along the vehicle chassis side 16, below an access door 13. Thus the step will swing between an elevated rearward, inboard storage position (FIGS. 2 and 4) and a lowered, outward operative position (FIGS. 1, 3, and 5). The operative position is forward of the storage position.

It should be understood that the orientations related above are given by way of example simply to aid description of the invention and to provide a correlation between the present invention and a vehicle to which it may be mounted. Certainly the present invention could be mounted on the vehicle chassis at a location other than the location exemplified herein.

The fold-down step 10 includes a mounting bracket 20 that is secured by means 30 for mounting the bracket 20 to the vehicle chassis 12 along its bottom surface 15 at the ground clearance elevation thereof. Means 30 is simply comprised of holes in the bracket for receiving standard fasteners such as screws or bolts. Adapter bracket configurations such as shown at 31 in FIGS. 4 and 5 may be utilized to mount the present step to various vehicles. The adapter shape and size may vary according to the vehicle chassis and frame configuration.

The mounting bracket 20 includes a top surface 21 and a bottom surface 22 that are bounded by outward and inward mounting bracket edges 23, 24. The edges 23, 24 are joined by mounting bracket side edges 25, 26. The mounting bracket also includes angularly downward projecting outward and inward mounting flanges 27, 28 respectively for pivotably mounting the remainder of the fold-down step components.

It is preferred that the top surface 21 when mounted on the vehicle, lies in the plane of the vehicle bottom surface 15. It is also preferable that the bracket be mounted to the chassis with the outward mounting bracket flange 27 oriented just inward of the adjacent side wall 16 or door jamb of the vehicle chassis (FIG. 1) and with the inward mounting bracket edge 24 situated inboard from the outward edge 23. The outward and inward flanges 27, 28 will thus extend substantially longitudinally with respect to the longitudinal orientation of the vehicle chassis. In other words, the outward flange 27 will face the chassis side wall surface 16 as shown in FIG. 2. The mounting bracket 20 and mounting means 30 are also provided such that the flanges 27, 28 face angularly upward when mounted on the chassis.

A step plate 35 is provided in the preferred form, including top and bottom surfaces 36, 37 bounded by outward and inward step plate edges 38, 39. The edges 38, 39 are joined by step plate side edges 40. The actual configuration of the plate may vary. For example, the step plate could be substantially circular. The designation for outward, inward, and side edges is provided herein simply to aid the description of the step plate in relation to the mounting bracket, and the spatial relationship of the step plate to the bracket in operative and storage positions.

The step plate top surface 36 and the mounting bracket top surface 21 both lie preferably within substantially parallel planes. The angular relationships of these planes remain consistent (preferably parallel) regardless of the relative pivoted position of the step plate 35 between the elevated, storage position shown in FIGS. 2, 4, and the lowered, operative position shown in FIGS. 1, 3, and 5. The consistent angular position of the step plate 35 is maintained by provision of at least one and preferably a pair of swing arms 45, 46 that form a parallelogram linkage between the mounting bracket 20 and step plate 35. The swing arms 45, 46 include lower first ends 47, 48 that are pivotably connected to the step plate 35, preferably along an upturned flange along the inward step plate edge 39.

The swing arms 45, 46 extend to second ends 49, 50 that are pivotably connected to the mounting bracket 20, in the plane of the outward flange 27 thereon. The opposed ends of the swing arms are mounted by pivot pins 51 to the flange 27 and step plate. The pivot axes are substantially parallel and are spaced apart to form a parallelogram. Thus, a parallelogram form of linkage is provided between the bracket 20 and step plate 35 such that the top surface 36 of the step plate will remain in an angular position relative to a horizontal plane (the bottom surface of the vehicle being considered "horizontal"). This angular orientation with respect to the horizontal will remain constant throughout motion of the step plate between the upward, inoperative storage position and downward outwardly projecting operative position thereof. A stop 80 is provided on the bracket 20 in the downward path of the swing arms to prevent pivotal movement thereof beyond the operative position.

It may be noted from the figures that swing motion of the step plate between the two extreme positions is influenced by the angular orientation of the pivot axes. Thus, the step plate will swing down and outwardly from the storage position to the operative position. The step, in the operative position, is thus presented for ease in user access as a step up to the vehicle chassis. In the inoperative, storage position, the step plate 35 is shifted upward and inwardly to a compact inaccessible position adjacent the level of the chassis bottom 15. The planar top surface of the step plate is therefore substantially coplanar with the plane of the top mounting bracket surface 21. Further, the outward edge portion 38 of the step plate is situated at an inboard spaced position with respect to the same edge when the step plate is situated in the operative position.

A retainer is generally shown at 55 for normally urging the step plate to one of the operative or inoperative positions. In a preferred form, the retainer is comprised of an elongated tension spring 56 secured at one end 57 to the mounting bracket 20 and at an opposite end 58 which is operatively connected to the step plate 35 by way of a pivoted brace arm 60. The spring 56 is positioned to normally urge the step plate in the preferred form toward the elevated, storage position.

The brace arm 60 is provided, pivotably connected between the inward flange 28 of the recounting bracket 20 and the inward step plate edge 39.

The brace arm 60 includes a top end 61 pivotably mounted at pin 63 to the rear flange 28 and a bottom end 62 pivotably mounted at pin 64 to the step plate between the bottom swing arm ends 47, 48. The pivot axes at the opposed ends of the brace arm 60 are parallel to one another and substantially parallel to the parallelogram pivot axes of the swing arms 45, 46.

As shown in FIG. 1, the brace arm forms a strong triangular brace configuration. The brace configuration is intended to provide strength, bolstering the swing arms against bending when weight is applied to the step plate 35 when at its operative position.

The upward or top end 61 of the brace arm 60 is provided for connection to a connector linkage 65. The linkage 65 is preferably comprised of a shielded cable 66 slidably mounted by a cable mounting bracket 67 to the rearward edge of the mounting bracket 20. A first end 68 (FIG. 2) of the cable is operatively mounted to the swing arms by way of the brace arm 60. A second cable end is mounted at a connection point 69 on the vehicle door 13.

The cable shield 71 includes a guide 72 affixed at one end to the mounting bracket 67 to hold the cable in alignment with the upper end of the brace arm 60. The shield 71 then loops around the bracket 20, to where another fitting 73 at the opposite shield end is mounted to the vehicle chassis. This end is provided with a cable guide 70 which is mounted to the vehicle chassis adjacent the door jamb, between the door axis and the main step plate assembly.

The guide 70 may be mounted to the vehicle chassis in order to guide and align the cable 66 properly with the fold-down step and a desired cable end connection point 69 on the door substantially as shown in FIGS. 2 and 3.

The cable 66 acts upon the brace arm 60 to pull the step plate down to its operative position as the door is opened. Subsequently the cable is pulled back by the spring 56, acting on the brace 60 to move the step plate to the storage position as the door is closed. Thus the door movement between open and closed positions will influence corresponding movement of step plate 35 in an arc between the storage and operative positions.

FIG. 6 illustrates a safety release mechanism for the cable 66, should the step brace and swing arms for some reason become bound and unable to swing forwardly. A ball 75 at the inward end of cable 66 is releasably held between the brace 61 and a clamp plate 76. The clamp plate 76 is biased against the ball by a spring 78. Pressure adjustment is provided by a bolt 77 that is threadably mounted to the brace 61 and received through a hole in the plate 76. The bolt may be turned to increase the compression of the spring in clamping force against the ball 75. Likewise, the bolt can be loosened to relax the compressive force of the spring and relax the gripping force against the ball. Such adjustment enables selective adjustment of the force required to hold the ball from between the brace arm and plate 61, 76. Thus, if the brace arm and swing arms bind for some reason, the user may simply push outwardly against the door, pulling the ball 75 from between the brace arm 61 and clamp plate 76. The adjustment described above is provided simply to selectively adjust the releasing force.

It is noted that the motion of the step plate is in an arc defined by the pivot axes of the brace and swing arms. The axes are angular with respect to the horizontal plane or ground plane in order to provide the advantages of: (1) allowing elevational arcuate movement of the plate between the downward operative position and the upward storage position; and (2) allowing inward and outward motion of the plate between the inward storage position where the step plate is situated inward of the vehicle side wall, and the outward operative position where the plate projects outwardly to facilitate foot access.

The present invention is constructed of rigid metal plate and channel, connected by rigid metal pins to provide adequate support for usage by adult humans. It is conceivable, however, that the fold-down step be constructed of heavier gauge materials to facilitate use for purposes other than supporting the weight of the human. Selection of materials and thickness thereof is derived using standard engineering practices.

Mounting of the present folding step is simply accomplished by securing the mounting bracket 20 at an appropriate position on the bottom side 15 of the vehicle chassis and in the vicinity of the vehicle doorway. The mounting means, to this end, may utilize several sheet metal screws, bolts, or other appropriate fasteners that will securely clamp the mounting bracket 20 to the vehicle chassis. Care is taken to mount the step assembly such that the step plate 35 is situated in an unobtrusive location when in the storage position, and is exposed for use when in the operative position.

The connector means including the shield 71 and end fittings 70, 72, 73 are next mounted to the bracket 20 and the door 13. One fitting is connected to the bracket 67 on the mounting bracket 20, and the other is secured by an appropriate conventional fastener to the vehicle chassis in a position thereon to shield and guide the cable toward the desired position for the guide 70.

The guide 70 is mounted to the chassis between the mounting bracket 20 and door hinge. Here, the guide will guide motion of the cable 66 from the end 69 secured to the vehicle door 13 and the opposed end connected to the upward end of the brace 60. The arrangement is such that the door, when opened, will pull the cable. The cable 66 in turn will force the brace 60, swing arms 45, 46, and step plate 35 to swing against the pull of the spring 56 downwardly from the storage position to the operative position. The position of the cable on the door is arranged so that when the door is full open, the step plate 35 will correspondingly reach its full downward operative position, hitting block 80, which keeps the step from going past center. Likewise, as the door is closed, the cable will allow the retainer spring 56 to draw the step plate backward and up to its full retracted storage position.

Preferably, the step plate, when in the inoperative, storage position, is situated rearwardly of the mounting bracket (with respect to the forward end of the vehicle). This places the step plate behind the bracket 20 for protection during forward travel, and avoids binding between the step plate and any stationary objects that might be encountered as the associated vehicle moves forwardly.

In compliance with the statute, the invention has been described in language more or less specific as to exemplary features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fold-down step, comprising:
    a step plate including a substantially flat step surface formed in a step surface plane;
    a mounting bracket including a mounting surface formed in a mounting surface plane;
    swing arms mounting the step plate to the mounting bracket for pivotal movement relative to the mounting bracket, between an operative position wherein the mounting surface plane is spaced a first distance from the step surface plane, and a storage position where the step surface plane is spaced a second distance from the mounting surface plane, the second distance being less than the first distance;
    a retainer operatively connected between the step plate and mounting bracket for urging the step plate to move to one of the positions;
    a connector linkage means extending from a first end operatively mounted to the swing arms to a remote second end for pivotally moving the swing arms and step plate between the operative position and the storage position;
    a brace arm pivotally mounted between the mounting bracket and the step plate, extending at an angle relative to the swing arms from a top end mounted to the mounting bracket, to a bottom end mounted to the step plate; and
    a safety release means mounting the first end of the connector linkage means to the brace arm for release upon prescribed tension applied along the connector linkage means.

2. A fold-down step, as claimed by claim 1, wherein said swing arms are mounted to the step plate and mounting bracket on substantially parallel pivot axes.

3. A fold-down step, as claimed by claim 1, wherein said swing arms are mounted to the step plate and mounting bracket on substantially parallel pivot axes;

wherein the step plate includes inward and outward step plate edges;

wherein the mounting bracket includes inward and outward mounting bracket edges; and wherein the substantially parallel pivot axes are angled with respect to the mounting bracket such that the step plate pivots in an inclined arc.

4. A fold-down step, as claimed by claim 1, wherein the retainer is comprised of a tension spring operatively mounted between the mounting bracket and said step plate.

5. A fold-down step, as claimed by claim 1, wherein the step plate and mounting bracket include side edges and wherein one of the step plate side edges at the storage position of the step plate is adjacent one of the mounting bracket side edges.

6. A fold-down step, as claimed by claim 1 wherein the step plate includes inward and outward step plate edges and wherein the mounting bracket includes inward and outward mounting bracket edges; and wherein the brace arm extends from said top end mounted to the mounting bracket adjacent the inward mounting bracket edge, to said bottom end mounted to the step plate adjacent the inward step plate edge.

7. A fold-down step as claimed by claim 1 for a vehicle having a chassis and a door mounted thereon for movement between an open and a closed condition, wherein the safety release means is comprised of a ball operatively connected to the first end of the connector linkage means and a clamp operatively connecting the ball to the brace arm and biased to releasably clamp the ball and to release the ball to disconnect the connector linkage means and brace arm upon application of said prescribed tension on the connector linkage means by the vehicle door; said vehicle door being connected to said connector linkage means.

8. A fold-down step as claimed by claim 1 for a vehicle having a chassis and a door mounted thereon for movement between an open and a closed condition, wherein the safety release means is comprised of:

a ball on the connector linkage;

a clamp operatively mounted to the brace arm, connecting the ball to the brace arm; and said clamp being biased to releasably clamp the ball and to release the ball to disconnect the connector linkage and step plate upon application of said prescribed tension on the connector linkage by the vehicle door; said vehicle door being connected to said connector linkage means.

9. A fold-down step as claimed by claim 1 for a vehicle having a chassis and a door mounted thereon for movement between an open and a closed condition, wherein the safety release means is comprised of:

a ball;

a spring biased clamp;

wherein the ball and spring biased clamp are operatively mounted between the connector linkage means and the brace arm; and said spring biased clamp releasably clamping the ball and operable to release the ball to disconnect the connector linkage means and brace arm upon application of said prescribed tension on the connector linkage means by the vehicle door; said vehicle door being connected to said connector linkage means.

10. A fold-down step for a vehicle having a chassis and a hinged door mounted thereon for movement between an open and a closed condition, said fold-down step comprising:

a step plate;

a mounting bracket;

a swing arm mounting the step plate to the mounting bracket for pivotal movement relative to the mounting bracket between an operative position wherein the step plate is spaced downwardly from the mounting bracket by a first distance and a storage position wherein the step plate is spaced a second distance from the mounting bracket, the second distance being less than the first distance;

a connector linkage operatively mounted to the step plate and extending therefrom to the vehicle door, for moving the step plate to the operative position responsive to movement of said vehicle door to said open condition; and a safety release on the connector linkage for allowing the door to move to the open position despite binding of the swing arms, such as may be caused by accumulations of dirt upon the fold-down step.

11. A fold-down step as claimed by claim 10 wherein the safety release comprises:

a ball; and and a clamp operatively connecting the ball to the connector linkage and the step plate.

12. A fold-down step as claimed by claim 10 wherein the safety release comprises:

a ball on the connector linkage; and and a clamp operatively mounted to the step plate, connecting the ball to the step plate, biased to releasably clamp the ball and to release the ball to disconnect the connector linkage and step plate upon application of a prescribed force on the connector linkage by the vehicle door.

13. A fold-down step as claimed by claim 10 wherein the safety release is comprised of:

a ball;

a spring biased clamp;

wherein the ball and spring biased clamp are operatively mounted between the connector linkage and the step plate; and said spring biased clamp releasably clamping the ball and operative to release the ball to disconnect the connector linkage and step plate upon application of a prescribed force on the connector linkage by the vehicle door.

14. A step assembly for a vehicle, said vehicle having a chassis and a hinged door mounted thereon for movement between open and closed positions, said step assembly comprising:

a step;

a mounting bracket for connection to the vehicle chassis;

at least one swing arm connecting the step to the mounting bracket; said at least one swing arm and step being movable relative to the mounting bracket between extended and retracted positions;

a flexible sheathed cable operator comprising a cable slidably received within a sheath; said sheath being fixed at one end to the mounting bracket and at a remaining end fixed to the vehicle chassis;

said cable including a first end operatively mounted to the at least one swing arm and extending slidably through said sheath to a remote second end mounted to the door spaced from the door hinge; and whereby swinging motion of the door between the closed and open positions causes the flexible sheathed cable operator to operate the step between the retracted and extended positions.

15. A step assembly according to claim 14 and further comprising a safety release connected to said flexible sheathed cable operator which allows the door to open despite binding which prevents the step from moving into the extended position.

16. A step assembly according to claim 14 wherein the cable is connected at the remote second end to lower portions of the door near the door hinge.

17. A step assembly according to claim 14 wherein there are at least two swing arms.

18. A step assembly according to claim 14 wherein there are at least two swing arms mounted for pivotal movement about obliquely inclined pivot axes which result in the step moving downwardly and outwardly when operated into the extended position.

19. A step assembly according to claim 14 wherein there are at least two swing arms mounted for pivotal movement about obliquely inclined pivot axes which result in the step moving downwardly and outwardly when operated into the extended position; and
    further comprising a safety release connected to said flexible sheathed cable operator which allows the door to open despite binding which prevents the step from moving into the extended position.

20. A step assembly according to claim 14 wherein there are at least two swing arms mounted for pivotal movement about obliquely inclined pivot axes which result in the step moving downwardly and outwardly when operated into the extended position;
    further comprising a safety release connected to said flexible sheathed cable operator which allows the door to open despite binding which prevents the step from moving into the extended position; and
    wherein the cable is connected at the remote second end to lower portions of the door near the door hinge.

21. A fold-down step, comprising:
    a step plate with a top step surface formed in a step surface plane and including inward and outward step plate edges;
    a mounting bracket including inward and outward mounting bracket edges;
    a pair of substantially equal length parallel swing arms having top ends mounted to the mounting bracket and bottom ends mounted to the step plate for pivotal movement about substantially parallel swing arm axes relative to the mounting bracket, between (a) an operative position wherein the step plate is located below the mounting bracket, and (b) a storage position where the mounting bracket and step plate are oriented alongside one another; and
    wherein the parallel swing arm axes are offset from one another with respect to the mounting bracket and are positioned on the mounting bracket and step plate in a parallelogram configuration such that in the storage position the swing arms overlap in a compact juxtaposed configuration and are substantially parallel to the step surface plane;
    wherein the pivot axes for the swing arms bottom ends are spaced unequal distances from the step surface plane.

* * * * *